MANUFACTURE OF POUR DEPRESSOR

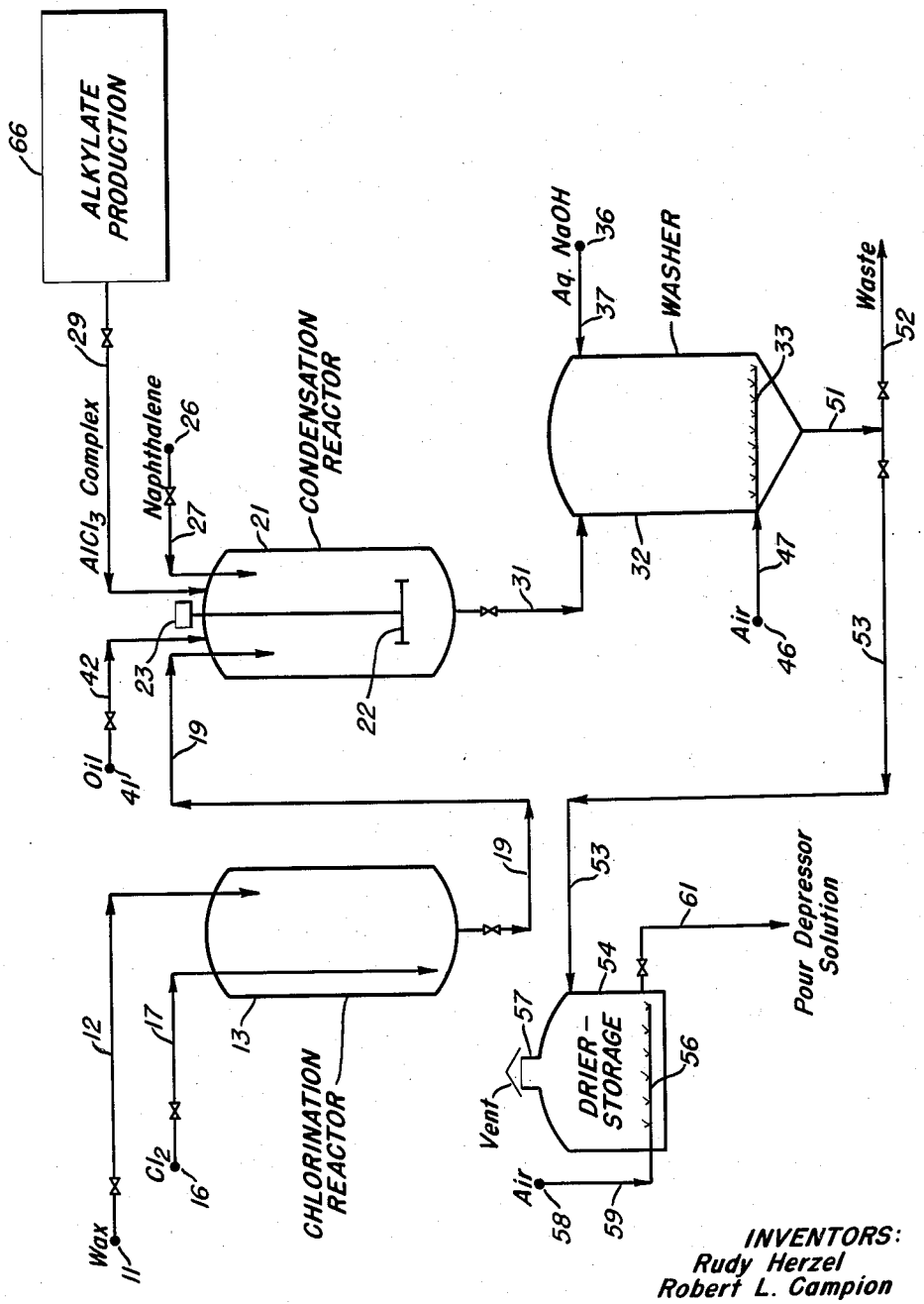

Rudy Herzel, Dyer, and Robert L. Campion, Whiting, Ind., assignors to Standard Oil Company, Chicago, Ill., a corporation of Indiana Filed Oct. 12, 1956, Ser. No. 615,575

2 Claims. (Cl. 260—671)

This invention relates to the manufacture of pour depressor for use with wax-containing lubricating oil and to the pour depressor itself.

In order to lower the pour point of lubricating oils which have present appreciable amounts of wax it is customary to add a small amount of high molecular weight material, these added materials are customarily called pour depressors. In general these pour depressors are made by reacting a chlorine containing paraffin wax with naphthalene in the presence of solid aluminum chloride catalyst. This is a batch reaction with the solid $AlCl_3$ being dribbled into the reactor over the total reaction time. Solid aluminum chloride particles tend to agglomerate into lumps and also are corrosive after having been exposed to atmospheric humidity. In this process considerable foaming of the reactor contents occurs with each addition of the solid $AlCl_3$ catalyst.

An object of the invention is a process for making pour depressor which eliminates the agglomeration and corrosion problems of the use of solid $AlCl_3$ catalyst. Another object is a process which reduces the amount of foaming occurring in the manufacture of pour depressor using solid $AlCl_3$ catalyst. A particular object is an improved and simplified process for making pour depressor. A further particular object is a pour depressor which is more effective than that made by the solid $AlCl_3$ catalyzed process. Other objects will become apparent in the course of the detailed description of the invention.

It has been discovered that the problems in connection with the addition of solid $AlCl_3$ catalyst to the reaction of chlorinated paraffin wax and naphthalene are either completely overcome or markedly reduced when an $AlCl_3$-hydrocarbon complex is used as the catalyst instead of solid $AlCl_3$ particles. The agglomeration and sticking problems are eliminated, the corrosion problems are essentially eliminated, the foaming of the reaction mixture at each addition of catalyst is very markedly reduced over the use of solid $AlCl_3$ particles. When using the $AlCl_3$-hydrocarbon complex catalyst the pour depressor produced is a more effective depressing material than the pour depressor made when using solid $AlCl_3$ particles.

The invention is described in detail in conjunction with the annexed figure which forms a part of this specification. The figure is illustrative and many items of process equipment have been omitted as these may be readily added by those skilled in the art. It is to be understood that the manufacturing procedure found herein for the preparation of the pour depressor of the invention is, with the exception of the use of the defined complex, entirely conventional in the manufacture of the so-called Pourex and Paraflow pour depressors sold commercially.

In the figure paraffin wax from source 11 is passed by way of valved line 12 into an upper part of glass-lined reactor 13. Paraffin wax such as is obtained from petroleum is utilized in the preparation of the pour depressor. Paraffin wax having a melting point between 128° and 136° F. is particularly suitable. It is preferred to use paraffin wax melting between about 130° and 132° F. In this embodiment about 3200 pounds or 500 gallons of wax are charged to chlorination reactor 13. Cylinder chlorine from source 16 is passed by way of valved line into the bottom of reactor 13. Reactor 13 is raised to a temperature and maintained at the temperature between about 200° and 275° F. by means not shown. For example, chlorination reactor 13 is jacketed and steam or hot water pass through the jacket. Sufficient chlorine is introduced into reactor 13 to produce a chlorinated paraffin wax having a chlorine content preferably between about 12 and 16 weight percent, specifically about 14 percent. More than the required amount of chlorine is usually added as some material leaves the reactor by a vent not shown. In this embodiment 1340 pounds of chlorine gas are introduced; this is about 120 percent of the theoretical requirement to produce 14 percent chlorinated paraffin wax. The chlorination reaction at a temperature between about 225° and 250° F. requires about 16 hours' time. The reaction time is dependent not only on the temperature at which the reactor is maintained but also upon the amount of chlorine which is to be introduced into the paraffin wax charged.

The chlorinated paraffin wax is passed from chlorination reactor 13 by way of valved line 19 into condensation reactor 21. Condensation reactor 21 is a glass lined vessel provided with a stirrer 22 driven by motor 23. Solid naphthalene from source 26 is passed by way of valved line 27 into reactor 21. In general reactor 21 is charged with chlorinated wax and naphthalene in an amount between about 6 and 10 pounds of wax, calculated as paraffin wax charged into reactor 13 per pound of naphthalene charged into reactor 21. In this embodiment 415 pounds of naphthalene are charged to reactor 21.

The temperature in reactor 21 is maintained at between about 175° F. and 225° F. more usually between about 190° F. and 210° F. Catalyst is introduced by way of line 29 into the top of reactor 21. The catalyst may be introduced into the reactor in small batches distributed over the reaction time or it may be introduced continuously over the reaction time. The reaction in reactor 21 generally takes between about 6 and 10 hours depending upon the temperature and the effectiveness of the stirring operation and is complete when foaming ceases.

At the completion of the reaction between the chlorinated paraffin wax and naphthalene in reactor 21 the product mixture is withdrawn from reactor 21 by way of valved line 31 into washer 32. Washer 32 is a cone bottomed vessel provided with an air distributor 33 near the bottom of the vessel 32. In washer 32 the catalyst content of the reaction product mixture from line 31 is neutralized with aqueous caustic solution. The neutralization may be with any alkali or alkaline medium in this embodiment aqueous sodium hydroxide from source 36 is passed by way of line 37 into washer 32. Herein 840 pounds of sodium hydroxide in the form of an 18 percent aqueous caustic solution is added to washer 32. In order to simplify the contacting low viscosity lubricating oil from source 41 is passed by way of valved line 42 into reactor 21 after the reaction product mixture has been withdrawn. This oil flushes the remaining reaction product mixture from reactor 21 and carries it into washer 32 by way of line 31. The low viscosity oil is preferably a material having a viscosity of the S.A.E. 5 or 10 range somewhat lower viscosity may be used or even viscosity intermediate S.A.E. 10 and S.A.E. 20 oil. As this oil acts as a diluent for the pour depressor there will eventually appear in lubricating oil, it is preferred that the diluent oil in itself be useful for the lubrication of automotive engines and the like.

In this embodiment 2500 gallons of S.A.E. 10 motor oil base are used to flush reactor 21 and appear in washer 32. The contents of washer 32 are maintained close to the boiling point of water on the order of 190°–200° F. while the contents are agitated by means of air from source 46 passed by way of line 47 and distributor 33. The agitation is maintained for a time between about 1 and 3 hours until the product is benzene-free or until the catalyst content of the reaction product mixture has been neutralized. A slight excess of caustic is used in order to insure that the pour depressor is completely neutralized.

After neutralization the lower aqueous phase which contains the neutralized aluminum chloride is withdrawn from washer 32 by way of lines 51 and 52. The pour depressor-oil solution is withdrawn from washer 32 by way of lines 51 and 53 and passed into dryer-storage vessel 54. Vessel 54 is provided with air distributor means 56 and vent 57. The water which is dissolved and occluded in the pour depressor solution is removed by air blowing with air from sources 58 passed through line 59 and distributor 56. The drying operation is carried out at a temperature on the order of 200° F. In general the drying operation takes from 1 to 6 hours depending upon the particular conditions maintained in vessel 54.

The dried solution may be withdrawn from vessel 54 by way of valved line 61. If necessary to bring the solution to the desired dilution additional oil may be added to the solution either in vessel 54 or in washer 32 before passing the neutralized solution to vessel 54. In general the pour depressor solution will contain about 10 and 40 weight percent of pour depressor and the remainder low viscosity lubricating oil. More usually the solution will contain about 15 to 20 percent of pour depressor.

Although the above embodiment has been described in terms of preparing a pour depressor-oil solution it is to be understood that a pour depressor which is not diluted with oil may also be prepared by use of the above described procedure.

In the reaction in reactor 21 solid aluminum chloride particles are conventionally used in an amount between about 1 and 5 weight percent based on the total of paraffin wax and naphthalene charged to the process. More usually between about 2 and 3 weight percent of $AlCl_3$ solid is used. In the process of the invention an $AlCl_3$-hydrocarbon complex is used as the catalyst in reactor 21. The complex usage is such that the apparent or theoretical $AlCl_3$ present in retcaor 21 is substantially the same as that that would have been present had solid $AlCl_3$ been used. In this embodiment 30 gallons of complex providing 83 pounds of aluminum chloride (theoretical) is charged to reactor 21 by way of valved line 29.

The $AlCl_3$-hydrocarbon complex utilized as catalyst in the process of the invention is derived from the preparation of detergent alkylate or alkymer. The production of the $AlCl_3$-hydrocarbon complex is depicted in the block 66 labeled alkylate production in the figure. This is an entirely conventional detergent alkylate production and it is not considered necessary to show the detail of the procedure. Typically the alkylation is carried out by reacting benzene with an olefin containing from 9 to 15 carbon atoms, preferably an olefin polymer containing 12 to 15 carbon atoms for example, propylene tetramer or butylene trimer. Between about 5 and 20 moles of benzene are present in the alkylation reactor per mol of olefin in order to obtain an alkylate mixture which is substantially the monoalkylate. The reaction is carried out in the presence of solid aluminum chloride particles, between about 1 and 10 weight percent of aluminum chloride based on olefin charged, and about between 0.1 and 1 weight percent of hydrogen chloride gas based on olefin are used as the catalyst for the alkylation reaction. For example, 3 weight percent of $AlCl_3$ and 0.3 weight percent of HCl are used as the catalyst. A complex of aluminum chloride and benzene hydrocarbons forms in the alkylation reactor during the alkylation reaction. The alkylation hydrocarbon reaction mixture of benzene alkylate and complex is withdrawn from the reactor. The complex is separated from the alkylation hydrocarbon reaction mixture. The hydrocarbon reaction mixture is neutralized and distilled to recover benzene and product monoalkylate and some heavy alkylate.

The $AlCl_3$-hydrocarbon complex is viscous heavy liquid usually having a specific gravity slightly in excess of one. It is this complex which is used as the catalyst in the process of the invention herein.

The exact analysis of the complex is unknown since analytical procedures necessarily destroy the chemical composition. However, in general the complex contains between about 30 and 35 weight percent of aluminum and chlorine calculated at $AlCl_3$ (theoretical). Also the complex contains between about 35 and 45 weight percent of benzene. The remainder of the complex consists of higher boiling alkylated benzenes containing, it is believed 2 or more alkyl groups. The higher boiling alkylated benzenes are a reddish brown color and are commonly designated as "red oil." Analysis of a typical $AlCl_3$-hydrocarbon complex which was utilized in the tests set out below showed: chloride, 25.9 weight percent; aluminum, 6.5 weight percent; benzene, 40.5 weight percent; and red oil 27.1 weight percent; the specific gravity of the complex was 1.06. Upon decompositon of the complex with warm water 21 volume percent was water soluble and 79 volume percent was water insoluble.

It is to be understood that the illustrative embodiment depicted above is merely one of many variations which are well known in this art not only for the preparation of the chlorinated wax-naphthalene pour depressor, but also for the detergent alkylates well known to this art.

The results obtainable by the process of the invention as compared with the conventional procedure are set out in the following illustrative tests.

*Test 1*

In this test pour depressor solution was prepared by reacting on a commercial scale using equipment such as described in the illustrative embodiment under the typical conditions set out therein. The catalyst used in this test (which represents a number of actual large scale batches) was solid aluminum chloride in an amount of 2.3 weight percent based on paraffin wax and naphthalene charged. The diluent oil was a S.A.E. 10 oil and was used in an amount such that the charged solution contained 16 percent of the pour depressor. The diluent oil had the following characteristics: gravity API 27.3; flash point 415° F.; pour point 5° F.; viscosity as seconds Saybolt Universal at 100° F. was 205; viscosity as seconds Saybolt Universal at 210° F. was 45; and the ASTM-Union color was 2–2½. One percent by volume of the pour depressor-oil solution was added to S.A.E. 10 oil. The pour point of the pour depressor solution containing oil was lowered 25° F.

*Test 2*

In this test $AlCl_3$-hydrocarbon complex was used as catalyst to prepare several batches of pour depressor-oil solution. The complex had the characteristics set out as typical above. Sufficient complex was used so that the theoretical $AlCl_3$ usage was identical with that of the solid $AlCl_3$ usage of Test 1. One percent by volume of the pour depressor-oil solution lowered pour point of the S.A.E. 10 oil to which it was added by 35° F.

Thus by the change of catalyst from solid aluminum chloride to the designated complex it is possible to increase the pour point lowering by 10° F. or in order to obtain the same amount of pour point lowering it is possible to reduce the amount of pour depressor added by about ¼.

It was observed in the reactions using the complex catalyst that the amount of foam during the reaction was substantially less than when using solid catalyst and that the foaming was readily controlled by changing the amount of catalyst being added over any given period of time. The use of the liquid complex also eliminated the variation in catalyst addition due to lumping and also virtually eliminated the health hazard and the corrosion of the equipment due to gas escape via the $AlCl_3$ inlet.

*Test 3*

In this test a series of comparative tests was made in order to determine if a single component of the complex was responsible for the improvement in pour depressing qualities of the pour depressor. A laboratory operation was made which closely resembled a full size commercial batch operation. These tests produced a pour depressor-oil solution containing 16 percent of pour depressor. In the tests 1 percent of the solution was added to S.A.E. oil and the pour point depressing effect noted.

A test was carried out using anhydrous solid aluminum chloride particles as catalyst. The pour depressor solution from this test lowered the pour point of the oil by 30° F.

In this test $AlCl_3$-hydrocarbon complex was used as the catalyst. The pour point of the test oil was lowered by 35° F. when pour depressor solution from complex catalyzed reaction was used.

In this test solid aluminum chloride was used as the catalyst and benzene was added to the reaction zone. The amount of benzene added corresponded to that which would have been present had complex been used as the catalyst. The pour point of the oil containing pour depressor solution made in this test was lowered only 25° F. Thus it appears that benzene added to the reaction zone had a harmful effect on the pour depressor made.

In this test solid $AlCl_3$ was used as a catalyst; red oil derived by the water decomposition of complex also added to the reaction zone in the amount that would have been present had the complex been used as a catalyst. The test oil containing pour depressor solution made in this test had a pour point lowering of only 15° F.

The results of Test 3 which were run under virtually identical running conditions except for the "catalyst" used show that the complex produces a result which is better than that of the conventional solid aluminum chloride catalyst and that surprisingly the presence of each of the major components of the complex alone with solid aluminum chloride has a harmful effect on pour depressor quality. It is apparent that the presence of the three constituents in the "chemical combination" known as $AlCl_3$-hydrocarbon complex has an unexpected promotional effect on catalyst activity.

Thus having described the invention what is claimed is:

1. An improved process for preparing a pour depressor suitable for use in wax-containing hydrocarbon oil which process comprises (1) chlorinating a paraffin wax having a melting point between about 128° and 136° F., at a temperature between about 200° and 275° F. until the product has a chlorine content between about 12 and 16 weight percent, (2) reacting said chlorinated wax and naphthalene, between about 6 and 10 lbs. of said paraffin wax per lb. of naphthalene, at a temperature between about 175° and 225° F., in the presence of a catalyst, (3) removing catalyst from the product mixture of step 2 by contacting said mixture with aqueous caustic solution and separating neutralized pour depressor from aqueous solution, and (4) removing water from neutralized pour depressor to obtain essentially anhydrous pour depressor, wherein said catalyst consists of an $AlCl_3$-hydrocarbon complex containing between about 30–35 weight percent of $AlCl_3$ (theoretical), about 35–45 weight percent of benzene and the remainder higher boiling alkylated benzenes, which complex had been derived from the alkylation of benzene with an olefin polymer containing 12–15 carbon atoms, under conditions to produce predominately the monoalkylate, using between 1 and 10 weight percent of solid $AlCl_3$ catalyst and 0.1 to 1 weight percent of HCl, based on olefin polymer charged and the subsequent separation of liquid $AlCl_3$-hydrocarbon complex from the alkylation hydrocarbon reaction mixture.

2. The process of claim 1 wherein a low viscosity mineral lubricating oil is used to dilute the pour depressor product mixture of step 2, said oil being used in amount such that the pour depressor-oil solution from step 4 contains between about 10 and 40 weight percent of pour depressor.

References Cited in the file of this patent

UNITED STATES PATENTS

| | | |
|---|---|---|
| 2,297,292 | Davis et al. | Sept. 29, 1942 |
| 2,419,632 | Day | Apr. 29, 1947 |
| 2,424,956 | Reiff et al. | July 29, 1947 |
| 2,554,245 | Dornte | May 22, 1951 |

FOREIGN PATENTS

| | | |
|---|---|---|
| 627,903 | Great Britain | Aug. 18, 1949 |
| 505,222 | Canada | Aug. 17, 1954 |

OTHER REFERENCES

"Lubricating Oil Additives" (Kalichevsky), pub. by Petroleum Refiner, vol. 28, No. 6, June 1949 (pages 98–100).